UNITED STATES PATENT OFFICE.

SUSETTE ORTH, OF PITTSBURG, PENNSYLVANIA.

IMPROVEMENT IN ARTIFICIAL FLOWERS.

Specification forming part of Letters Patent No. 161,350, dated March 30, 1875; application filed February 8, 1875.

*To all whom it may concern:*

Be it known that I, Mrs. SUSETTE ORTH, of Pittsburg, in the county of Allegheny and State of Pennsylvania, have invented a new and useful Improvement in the Manufacture of Wax Flowers; and I do hereby declare the following to be a full, clear, and exact description thereof:

My invention relates to the manufacture of wax flowers, and the preparation of the wax therefor; and it consists, first, in forming artificial flowers from tissue-paper or other suitable material, coated with a compound of india-rubber and wax; and, secondly, in imparting the desired tint or shade of color to the sheet or flower by means of the tissue-paper or other material to which the compound is applied.

Wax has been mixed with various ingredients to give body to the sheet; but in all cases the brittleness of the compound has necessitated great care in handling the flowers, and has precluded their use as articles of wear, to meet the demand for which the French flowers, or muslin flowers, are imported at great expense.

The object of the present invention is to produce an article which will take the place of French flowers, having sufficient tenacity to be used as an article of wear, and not brittle, like the ordinary wax flowers, or easily crumpled, like the muslin article.

In preparing the compound I use, I take white wax in any required quantity and india-rubber as commonly found in commerce, preferably in the native state, and render them liquid by heat—generally steam-heat or a water-bath. The relative amount of the rubber to the wax will be, say, one ounce of rubber to the pound of wax. I continue to boil the rubber and wax together for three or four hours, or until such a time as the wax has taken up sufficient rubber to give it the required tenacity, when the surplus or undissolved rubber is removed. The compound is then removed from the fire and is ready to be applied to the fabric, which gives body to the sheet. For this purpose I prefer to use tissue-paper, and, in general, French tissue-paper, which is of finer quality and more evenly colored.

Having removed the compound from the fire, it must be kept liquid while being applied to the sheets of tissue-paper, and this I accomplish by adding a small quantity of hot water to the wax, which causes the wax to float and preserves its heated fluid condition.

I then select the tissue-paper of the required tints and dip them carefully in the liquid, raising them vertically therefrom, and as the coating commences to chill, or set, it may be thickened by sweeping the paper backward and forward over the surface of the melted compound. Repeated dippings and the temperature of the wax will determine the thickness of the coating. By this means sheets of varying thickness may be obtained, though, for ordinary purposes, the thin-coated sheets are the most useful.

The advantages of my invention are that wax flowers may be formed having sufficient strength and durability to be worn as articles of dress, and sufficiently pliable to permit of their being restored when crumpled or disarranged. The sheets of wax can be worked more readily in forming flowers and similar articles and from the thinness of the sheets which can be used, the article formed will have a more natural appearance. Finally, the trouble and expense of coloring are avoided, as the color of the tissue-paper employed as a base or foundation for the wax compound will determine the color of the sheet produced.

The tissue-paper may be dipped in wax alone and produce an excellent effect, but is not so tough and pliable an article as when rubber is added to the compound, which will prevent the peeling of the wax, and counteract its brittleness in working.

Having thus described my invention, what I claim, and desire to secure by Letters Patent, is—

1. As a new article of manufacture, artificial flowers made of tissue-paper or other suitable material, and coated with a compound of india-rubber and wax, substantially as described, and for the purpose specified.

2. Sheets of tissue-paper or other suitable material, coated with a compound of india-rubber and wax, and tinted in various colors previous to the application of such compound, substantially as and for the purpose set forth.

In testimony whereof I, the said SUSETTE ORTH, have hereunto set my hand.

SUSETTE ORTH.

Witnesses:
F. W. RITTER, Jr.,
T. B. KERR.